United States Patent [19]

McDaniel et al.

[11] Patent Number: 5,641,842

[45] Date of Patent: Jun. 24, 1997

[54] ETHYLENE COPOLYMERIZATION PROCESS

[75] Inventors: Max P. McDaniel, Bartlesville, Okla.;
Rickey D. Badley, Olathe, Kans.;
Bruce E. Kreischer, Houston, Tex.;
Joseph S. Shveima, Bartlesville, Okla.

[73] Assignee: Phillips Petroleum Company, Bartlesville, Okla.

[21] Appl. No.: 471,894

[22] Filed: Jun. 7, 1995

[51] Int. Cl.⁶ .................................................. C08F 4/24
[52] U.S. Cl. .................... 526/96; 526/106; 526/130; 526/908; 502/242; 502/256; 502/305; 502/309
[58] Field of Search ..................... 526/96, 106, 130, 526/908

[56] References Cited

U.S. PATENT DOCUMENTS

| | | | |
|---|---|---|---|
| 3,132,125 | 5/1964 | Schwander et al. | 260/88.2 |
| 3,925,338 | 12/1975 | Ort | 260/88.2 R |
| 4,228,261 | 10/1980 | Scholten et al. | 526/106 |
| 4,845,176 | 7/1989 | Konrad et al. | 526/908 |
| 4,946,914 | 8/1990 | Hsieh | 526/106 |
| 5,096,868 | 3/1992 | Hsieh et al. | 502/107 |
| 5,264,506 | 11/1993 | Eisinger et al. | 526/194 |
| 5,393,719 | 2/1995 | Pettijohn et al. | 402/113 |

OTHER PUBLICATIONS

Whitaker, H.L. and Wills, G.B., A Study of the Surface-Catalyzed Polymerization of Ethylene on Chromic Oxide-Silica-alumina Catalysts, Journal of Applied Polymer Science, vol. 13, pp. 1921–1927 (1969).

McDaniel, M.P., Fracturing Silica–Based Catalysts During Ethylene Polymerization, Journal of Polymer Science: Polymer Chemistry Edition, vol. 19, 1967–1976 (1981).

*Primary Examiner*—Romulo H. Delmendo
*Attorney, Agent, or Firm*—Carl D. Corvin

[57] ABSTRACT

A process is provided comprising copolymerizing, under copolymerizing conditions, ethylene with one or more alpha-olefins, using a catalyst system, where said catalyst system has been sized, to produce a lower-density-copolymer, where said lower-density-copolymer has a density lower than a similar copolymer produced by copolymerizing, under said copolymerizing conditions, ethylene with said one or more alpha-olefins, using said catalyst system, where said catalyst system has not been sized, where said catalyst system that has been sized has had substantially all particles removed that produce, under said copolymerizing conditions, a higher-density-copolymer, where said higher-density-copolymer has a density higher than said similar copolymer.

25 Claims, No Drawings

ETHYLENE COPOLYMERIZATION PROCESS

BACKGROUND

This invention is related to the field of copolymerizing ethylene with an alpha-olefin.

The density and molecular weight of an ethylene/alpha-olefin copolymer determines, in a large part, the physical properties of such copolymers. Density, for example, helps determine, in part, the environmental stress crack resistance, impact strength, stiffness, hardness, tensile strength, permeation, and warpage of a copolymer. Finding means to produce a copolymer of a desired density is of great importance. This invention provides a means to produce copolymers of desired densities.

SUMMARY

It is an object of this invention to provide a process to copolymerize ethylene and an alpha-olefin.

It is another object of this invention to provide a process to copolymerize ethylene and an alpha-olefin to produce a copolymer of a desired density.

In accordance with this invention a process is provided comprising copolymerizing, under copolymerizing conditions, ethylene with one or more alpha-olefins, using a catalyst system, where said catalyst system has been sized, to produce a lower-density-copolymer, where said lower-density-copolymer has a density lower than a similar copolymer produced by copolymerizing, under said copolymerizing conditions, ethylene with said one or more alpha-olefins, using said catalyst system, where said catalyst system has not been sized, where said catalyst system that has been sized has had substantially all particles removed that produce, under said copolymerizing conditions, a higher-density-copolymer, where said higher-density-copolymer has a density higher than said similar copolymer.

In accordance with this invention a process is provided comprising copolymerizing, under copolymerizing conditions, ethylene with one or more alpha-olefins, using a catalyst system, where said catalyst system comprises a chromium component and a support component, and where said support component comprises silica, and where said catalyst system consists essentially of particles with a size greater than 75 microns.

These and other objects of this invention will become better understood with reference to the following Detailed Description of the Invention and the claims.

DETAILED DESCRIPTION OF THE INVENTION

The catalyst system used in this invention comprises a chromium component and a support component. The term "support component" is not meant to be construed as an inert component of the catalyst system.

The support component, in general, contains about 80 to about 100 weight percent silica based on the weight of the support component. The remainder, if any, is selected from the group consisting of alumina, boria, magnesia, thoria, titania, zirconia, and mixtures of two or more thereof. However, it is preferred if the support component comprises silica and titania. It is even more preferred if the support component consists essentially of silica and titania. In this form, the support component has about 80 to about 98 weight percent silica and about 2 to about 20 weight percent titania based on the weight of the support component. In the most currently preferred embodiment, the support component has about 94 to about 98 weight percent silica and about 2 to about 6 weight percent titania based on the weight of the support component.

These types of supports have, in general, a surface area from about 50 to about 700 square meters per gram and a pore volume from about 0.5 to about 4 cubic centimeters per gram. In a preferred embodiment the support component has a surface area from about 400 to about 600 square meters per gram and a pore volume of about 2 to about 3 cubic centimeters per gram. These types of support components are well known in the art and can be produced as disclosed in U.S. Pat. Nos. 3,887,494; 3,900,457; 4,119,569; 4,981,831; the entire disclosures of which are hereby incorporated by reference.

The chromium component can be combined with the support component in any manner known in the art, such as, for example, forming a co-precipitated tergel of silica, titanium, and chromium. Alternatively, an aqueous solution of a water soluble chromium component can be added to a hydrogel of the support component. Suitable water soluble chromium components include, but are not limited to, chromium nitrate, chromium acetate, and chromium trioxide. Alternatively, a solution of a hydrocarbon soluble chromium component such as tertiary butyl chromate, a diarene chromium compound, biscyclopentadienyl chromium (II), or chromium acetyl acetonate, can be used to impregnate a zerogel, which results from removal of water from a cogel.

The chromium component is used in an amount sufficient to give from about 0.05 to about 5, preferably 0.5 to 2 weight percent chromium, based on the total weight of the chromium component and the support component.

The resulting catalyst system is then subjected to activation system in an oxygen-containing ambient in a manner conventionally used in the art. Because of economy, the preferred oxygen-containing ambient is air, preferably dry air. The activation is carried out at an elevated temperature from about ½ to about 50 hours, preferably about 2 to about 10 hours, at a temperature within the range of about 300° C. to about 1000° C., preferably 300° C. to 800° C. Under these conditions, at least a portion of any chromium in a lower valence state is converted to the hexavalent state by this activation procedure.

The resulting activated catalyst system is cooled and then may be subjected to at least partial reduction of the hexavalent chromium to a lower valent state prior to copolymerization. The reducing agent must be carbon monoxide in order to effectively incorporate a comonomer into the copolymer. If a reducing agent other than carbon monoxide is used, higher amounts of comonomer are needed in the reaction zone to achieve similar amounts of comonomer incorporation into the resulting copolymer. Generally the activated catalyst is directly subjected to the reducing agent although intervening steps may be employed if desired. Carbon monoxide, if employed, can be employed at a temperature between about 300° C. to about 500° C. although it is preferable to employ temperatures in the range of 350° C. to 450° C. for best chromium reduction. The partial pressure of the reducing gas in a reducing operation can be varied from subatmospheric pressures to relatively high pressures. However, the simplest reducing operation is to utilize essentially pure carbon monoxide at about atmospheric pressure.

The reduction time can vary from a few minutes to several hours or more. The extent of reduction can be followed by visual inspection of the catalyst system color. The color of the initial activated catalyst system is generally orange, indicating the presence of hexavalent chromium. The color of the reduced catalyst system is blue, indicating that all or essentially all of the initial hexavalent chromium has been reduced to a lower oxidation state, generally the divalent state. After reduction, the reduced supported catalyst system is cooled to about room temperature, e.g. about 25° C. in an inert atmosphere such as argon or nitrogen to flush out the carbon monoxide. After this flushing treatment, the catalyst system is kept away from contact from either reducing or oxidizing agents, i.e., carbon monoxide and oxygen.

In general, any catalyst system made in accordance with the above procedures will contain particles of many different sizes. This particle size distribution can range from broad to narrow. The catalyst system can be sized to separate these particles into different size groupings. Using these sized catalyst systems in copolymerization runs will give an indication of the type of copolymer each sized catalyst system produces under the copolymerization conditions. In particular, different density copolymers can be made by these sized catalyst systems. In general, these sized catalyst systems will make copolymers with both higher densities and lower densities than a copolymer made with a unsized catalyst system. After ascertaining the catalyst systems that make higher density copolymers these catalyst systems can be sized from further copolymerization runs thereby obtaining the desired lower density copolymers.

In general, removing substantially all catalyst system particles with a size less than 75 microns can give a sized catalyst system that produces a copolymer that has a lower density than a copolymer produced from an unsized catalyst system. In a preferred embodiment, removing substantially all catalyst system particles with a size less than 180 microns can give a sized catalyst system that produces a copolymer that has a significantly lower density than a copolymer produced from an unsized catalyst system. It should be noted that the support component can be sized prior to the introduction of the chromium component thereby saving chromium that might be loss in a sizing process. The term "substantially all" as use herein means the catalyst system particles that fall below the size limit do not affect the density of the resulting copolymer by more than about ±0.002.

The catalyst system can be sized in any manner known in the art such as, for example, screening, ultrafiltration, elutriation, and sedimentation. Additionally, a catalyst system can be produced where the particles are already of the desired size.

In the process of this invention ethylene is copolymerized with an alpha-olefin. The alpha-olefin can have from three to 20 carbon atoms in its molecular structure. In particular, the alpha-olefin can be selected from the group consisting of propylene, 1-butene, 3-methyl- 1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures of two or more said alpha-olefins. However, in a preferred embodiment 1-hexene is preferred. Polymerization of ethylene with an alpha-olefin can be carried out under any conditions known in the art. However, slurry, also known as particle form, polymerization conditions wherein the temperature is kept below the temperature at which the copolymer goes in solution is preferred. Such polymerization techniques are well known in the art and are disclosed, for instance, in U.S. Pat. No. 3,248,179, the entire disclosure of which is hereby incorporated by reference. The preferred temperature in a particle form process is within a range of about 150° F. to about 230° F. Reactor pressure usually is in the range of about 300 to about 700 psig and preferably is within the range of 400 to 600 psig for best reactor operating parameters. Two preferred polymerization methods for the slurry process are those employing a loop reactor of the type disclosed in U.S. Pat. No. 3,248,179 and those utilizing a plurality of stirred reactors here in series, parallel, or combinations thereof, wherein the reaction conditions are different in the different reactors.

The copolymers produced according to this invention, in general, have densities less than 0.96 grams per cubic centimeter. However, copolymers having densities between about 0.90 and about 0.95 are readily producible. In a preferred embodiment, copolymers with densities from about 0.905 to about 0.935 are readily producible and in a most preferred embodiment, copolymer with densities from 0.915 to 0.925 are readily producible.

EXAMPLES

These examples are provided to further assist a person skilled in the art with understanding this invention. These examples are intended to be illustrative of the invention and are not meant to be construed as limiting the reasonable scope of the invention.

Example

The catalyst system used in the runs of this example was 964 Magnapore, available from Davison Chemical Company, a Division of W.R. Grace. It contained 0.87 weight percent chromium based on the weight of the chromium component and the support component. It also contained 3.6 weight percent titanium, the remainder consisted essentially of silica, based on the weight of the support component. The catalyst system was activated at 650° C. for about 3 hours in air, and then reduced at 350° C. for about 0.5 hour in the presence of carbon monoxide.

The polymerization runs were conducted under particle form conditions employing a 2.6 liter stainless steel jacketed reactor. After flushing the clean reactor with dry nitrogen and dry isobutane vapor, a weighed amount of catalyst system was charged. Then, 1.2 liters of dry liquid isobutane was added as the polymerization diluent. The comonomer (1-hexene) was charged by means of a syringe to the reactor containing the isobutane diluent and catalyst system. The sealed reactor was heated to the desired temperature (80° C.) after which the reactor was pressured to 550 psig with ethylene and maintained at that pressure throughout the reaction with ethylene flow to the reactor being regulated by the rate of polymerization.

After the desired polymerization run time, each run was terminated by shutting off the ethylene flow, cooling the reactor and venting the vapors from the reactor. The reactor was opened and solid polymer removed for drying and subsequent analyses.

In run 1 (control) the commercially obtained chromium catalyst system was activated and utilized as received while in runs 2–4 the chromium catalyst was subjected to a particle size screening operation which segregated the catalyst system into three fractions having the particle sizes as indicated in Table I below. These fractions were activated as described, prior to use. The polymerization results of these runs 1–4 are shown in Table I.

TABLE I

| Run No. | Catalyst Particle Size (μm) | Hexene (ml) | Productivity (g/g) | Reaction Time (min) | Activity (g/g-hr) | MI | HLMI | HLMI/MI | Density |
|---|---|---|---|---|---|---|---|---|---|
| 1 | Not Sized | 150 | 1235 | 61 | 1215 | 0.101 | 8.12 | 80 | 0.927 |
| 2 | <45 | 150 | 2672 | 62 | 2586 | 0.032 | 3.99 | 125 | 0.935 |
| 3 | 75–150 | 150 | 1789 | 64 | 1677 | 0.063 | 5.11 | 81 | 0.926 |
| 4 | 180–250 | 150 | 1100 | 62 | 1065 | 0.156 | 11.79 | 76 | 0.921 |

The results in runs 2–4 demonstrate a significant decrease in copolymer density as the particle size of the catalyst system is increased.

Comparative Example

Further polymerization runs were conducted with portions of the same activated catalyst systems that were utilized in the runs of the Example. However, in these runs no added alpha-olefin comonomer was utilized in the polymerization reactions and the polymerizations were conducted at 95° C. Thus, the polymerization runs represent the production of ethylene homopolymers. The polymerization results obtained in this series of runs are shown in Table II below.

TABLE II

| Run No. | Catalyst Particle Size (μm) | Hexene (ml) | Productivity (g/g) | Reaction Time (min) | Activity (g/g-hr) | MI | HLMI | HLMI/MI | Density |
|---|---|---|---|---|---|---|---|---|---|
| 5 | Not Sized | 0 | 1898 | 60 | 1898 | 0.000 | 2.83 | — | 0.956 |
| 6 | <45 | 0 | 3145 | 60 | 3145 | 0.033 | 2.95 | 89 | 0.956 |
| 3 | 75–150 | 0 | 906 | 61 | 891 | 0.005 | 2.26 | 422 | 0.956 |
| 4 | 180–250 | 0 | 992 | 61 | 975 | 0.16 | 2.65 | 171 | 0.955 |

The results in Table II demonstrate that the density of the ethylene homopolymer obtained was essentially unaffected by variation in catalyst particle size.

That which is claimed:

1. A process comprising copolymerizing, under copolymerizing conditions that comprise slurry polymerization conditions, ethylene with one or more alpha-olefins, using a catalyst system that comprises a chromium component and a support component, where said catalyst system has been activated so that at least a portion of any chromium in a lower valence state is converted to the hexavalent state, and where said catalyst system after it has been activated, is then reduced with carbon monoxide so that at least a portion of the hexavalent chromium is reduced to a lower valent state prior to copolymerization, and where said catalyst system has been sized, to produce a lower-density-copolymer, where said lower-density-copolymer has a density lower than a similar copolymer produced by copolymerizing, under said copolymerizing conditions that comprise slurry polymerization conditions, ethylene with said one or more alpha-olefins, using said catalyst system that comprises a chromium component and a support component, where said catalyst system has been activated so that at least a portion of any chromium in a lower valence state is converted to the hexavalent state, and where said catalyst system after it has been activated, is then reduced with carbon monoxide so that at least a portion of the hexavalent chromium is reduced to a lower valent state prior to copolymerization, and where said catalyst system has not been sized, and where said catalyst system that has been sized has had substantially all particles removed that produce, under said copolymerizing conditions that comprise slurry polymerization conditions, a higher-density-copolymer, where said higher-density-copolymer has a density higher than said similar copolymer.

2. A process according to claim 1 wherein said alpha-olefin is selected from the group consisting of propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures of two or more said alpha-olefins.

3. A process according to claim 2 wherein said catalyst system comprises a chromium component and a support component that comprises silica and titania.

4. A process according to claim 3 wherein said support component consists essentially of about 94 to about 98 weight silica and about 2 to about 6 weight percent titania.

5. A process according to claim 4 wherein said catalyst system that has been sized has had substantially all particles with a size less than 75 microns removed.

6. A process according to claim 5 wherein said catalyst system that has been sized has had all particles with a size less than 75 microns removed.

7. A process according to claim 4 wherein said catalyst system that has been sized has had substantially all particles with a size less than 180 microns removed.

8. A process according to claim 7 wherein said catalyst system that has been sized has had all particles with a size less than 180 microns removed.

9. A process according claim 1 wherein said alpha-olefin is 1-hexene.

10. A process according to claim 9 wherein said catalyst system comprises a chromium component and a support component that comprises silica and titania.

11. A process according to claim 10 wherein said support component consists essentially of about 94 to about 98 weight silica and about 2 to about 6 weight percent titania.

12. A process according to claim 11 wherein said catalyst system that has been sized has had substantially all particles with a size less than 75 microns removed.

13. A process according to claim 12 wherein said catalyst system that has been sized has had all particles with a size less than 75 microns removed.

14. A process according to claim 11 wherein said catalyst system that has been sized has had substantially all particles with a size less than 180 microns removed.

15. A process according to claim 14 wherein said catalyst system that has been sized has had all particles with a size less than 180 microns removed.

16. A process comprising copolymerizing, under copolymerizing conditions that comprise slurry polymerization conditions, ethylene with one or more alpha-olefins, using a catalyst system, where said catalyst system comprises a chromium component and a support component, and where said catalyst system has been activated so that at least a portion of any chromium in a lower valence state is converted to the hexavalent state, and where said catalyst system after it has been activated, is then reduced with carbon monoxide so that at least a portion of the hexavalent chromium is reduced to a lower valent state prior to copolymerization, and where said support component comprises silica, and where said catalyst system is in the form of particles, and where said particles consists essentially of particles with a size greater than 75 microns.

17. A process according to claim 16 wherein said alpha-olefin is selected from the group consisting of propylene, 1-butene, 3-methyl-1-butene, 1-pentene, 3-methyl-1-pentene, 4-methyl-1-pentene, 1-hexene, 3-ethyl-1hexene, 1-heptene, 1-octene, 1-nonene, 1-decene, and mixtures of two or more said alpha-olefins.

18. A process according to claim 17 wherein said support component comprises silica and titania.

19. A process according to claim 18 wherein said support component consists essentially of about 94 to about 98 weight silica and about 2 to about 6 weight percent titania.

20. A process according to claim 19 wherein said catalyst system consists essentially of particles with a size greater than 180 microns.

21. A process according to claim 16 wherein said alpha-olefin is 1-hexene.

22. A process according to claim 21 wherein said support component comprises silica and titania.

23. A process according to claim 22 wherein said support component consists essentially of about 94 to about 98 weight silica and about 2 to about 6 weight percent titania.

24. A process according to claim 23 wherein said catalyst system consists essentially of particles with a size greater than 180 microns.

25. A process comprising copolymerizing, under slurry polymerization conditions, ethylene with 1-hexene, using a catalyst system, where said catalyst system consists essentially of a chromium component and a support component, and where said catalyst system has been activated so that at least a portion of any chromium in a lower valence state is converted to the hexavalent state, and where said catalyst system after it has been activated, is then reduced with carbon monoxide so that at least a portion of the hexavalent chromium is reduced to a lower valent state prior to copolymerization, and where said support component consists essentially of silica and titania, and where said catalyst system consists essentially of particles with a size greater than 180 microns to produce a copolymer with a density in the range of 0.915–0.925 grams per cubic centimeter.

* * * * *